United States Patent

Nakayama et al.

[11] Patent Number: 5,930,464
[45] Date of Patent: Jul. 27, 1999

[54] APPARATUS FOR CONTROLLING A DIRECT MEMORY ACCESS OPERATION IN AN IMAGE PROCESSING APPARATUS

[75] Inventors: Wataru Nakayama; Teruyasu Watabe, both of Yokohama, Japan

[73] Assignee: Ricoh Company, Ltd., Tokyo, Japan

[21] Appl. No.: 08/734,849

[22] Filed: Oct. 23, 1996

[30] Foreign Application Priority Data

Oct. 23, 1995 [JP] Japan ................................ 7-274148

[51] Int. Cl.⁶ .......................... B41B 15/00; H04N 1/41; H04N 1/40
[52] U.S. Cl. .......................... 395/114; 395/114; 395/109; 358/426; 358/448
[58] Field of Search ................................ 395/114, 109; 358/448, 426, 523, 528

[56] References Cited

U.S. PATENT DOCUMENTS 5,574,834  11/1996  Horie et al. .......................... 395/114
5,638,183  6/1997  Hayashi et al. .......................... 358/300

Primary Examiner—Edward L. Coles
Assistant Examiner—Twyler Lamb
Attorney, Agent, or Firm—Oblon, Spivak, McClelland, Maier & Neustadt, P.C.

[57] ABSTRACT

A plurality of image data are DMA transferred to a printer for printing images as required, and the image data are once buffered in FIFO memories before they are output to the printer so as to reduce an amount of used memories and to provide efficient bus transactions. A DMA transfer apparatus includes a main memory, a CPU and a DMA controller, and is connected to a printer through a printer interface. The DMA controller has a plurality of DMA address registers and transfer count registers, FIFO memories for holding associated data therein and a selector unit for selecting DMA. The selector unit selects DMA addresses at about an earlier output timing to start a plurality of DMA operations to transfer data in conformity to the data output timing.

14 Claims, 4 Drawing Sheets

APPARATUS FOR CONTROLLING A DIRECT MEMORY ACCESS OPERATION IN AN IMAGE PROCESSING APPARATUS

BACKGROUND OF THE INVENTION

Field of the Invention

This invention relates to the field of DMA (Direct Memory Access). operations in a data processing apparatus, and more particularly to a DMA transfer apparatus for efficiently outputting respective color components or a plurality of image data stored in a main memory to a printer.

Discussion of the Background

A DMA mechanism is a portion of dedicated hardware for directly controlling a data transfer between a main memory and an input/output device independently of a central processing unit (CPU). When the CPU is provided with this DMA mechanism, the CPU can proceed to other processing after issuing an input/output start instruction to the DMA transfer mechanism.

FIG. 7 illustrates a block diagram of an embodiment of an image information processing apparatus, such as a printer system, which includes a background DMA mechanism. Referring specifically to FIG. 7, reference numeral 21 designates a system bus in the information processing apparatus to which a main memory 22, a DMA controller 23, a FIFO (First-In-First-Out) memory 24 and a CPU 25 are connected. Further, a printer apparatus 26 is connected to the FIFO 24. Although omitted in FIG. 7, the DMA controller 23 includes a memory address register, a transfer byte counter, and a control register, all for performing conventional DMA operations.

When the CPU 25 issues an input/output operation command to the DMA controller 23, the DMA controller 23 provides a memory address to determine a transferred data, a number of bytes to be transferred, and the input/output operation command, and provides them to the main memory 22 for the DMA operation of the transferred data.

Then, the DMA controller 23 starts a DMA operation, i.e., sequentially reads data from addresses of the main memory 22 indicated by the memory address register, writes the read data into the FIFO memory 24, and sequentially decrements the value set in the transfer byte counter.

The data written in the FIFO memory 24 is read therefrom in the order written and is then output to the printer apparatus 26. Thus, when the value of the transfer byte counter reaches zero, the DMA counter 23 terminates the DMA operation.

A color printer requires image data of respective color components, that is, C (cyan), M (Magenta), Y (yellow), and K (black) components. Generally, in an image forming process of the color printer, each of the respective color components must be printed at different timings. Therefore, when image data of the respective color components are simultaneously DMA transferred using a single FIFO memory as illustrated in FIG. 7, a portion of the memory corresponding to image data to be transferred at a later timing must be emptied, or image data filled with data indicative of a white color must be previously prepared in the memory before the DMA operation is executed. This results, however, in useless consumption of memory.

Also, even if the DMA operation is performed for each of the color components, the DMA controller must be started using the input/output operation command from the CPU for transferring image data respectively. Therefore, this causes an increase in transactions on a system bus. As a result, the amount of traffic on the system bus causes a reduction in system performance.

SUMMARY OF THE INVENTION

Accordingly, it is an object of the present invention to provide a novel apparatus for executing DMA operations effectively.

Another object of the present invention is to provide a novel DMA transfer apparatus for DMA transferring image data of respective color components to a color printer in an image processing apparatus, which is capable of eliminating useless consumption of memory, due to a preparation of empty data in accordance with a delay of printing operations. Additionally, the present invention is also capable of preventing image data from being delayed in reaching a printer due to increased bus traffic.

It is another object of the DMA transfer apparatus, for use in an image processing apparatus including a monochrome printer, to be capable of sequentially DMA transferring a plurality of image data to sequentially print out the plurality of image data.

In the present invention, a DMA transfer apparatus is provided for performing DMA operations, and is included in an image information processing apparatus in which a CPU, a main memory and a printer are connected. The DMA transfer apparatus includes a plurality of DMA address registers, a plurality of transfer count registers for executing a plurality of DMA operations and a DMA controller.

Furthermore, in the present invention, a selector unit provides instructions for instructing the DMA controller to select a DMA operation. In the DMA operation of the present invention, a plurality of FIFO memories are provided for holding transferred data which are read out from the main memory by the DMA operation executed by the DMA apparatus. Additionally, an input/output control unit is provided for outputting data from the plurality of FIFO memories to the printer in conformity to a printing operation of the printer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention may be implemented as a part of an image processing apparatus. It will be apparent, however, to one skilled in the art that the present invention may be practiced without such specific details. In other instances well-known operations, such as an image developing process in the apparatus therein, have not been shown in detail in order to not unnecessarily obscure the present invention.

Figure 1:
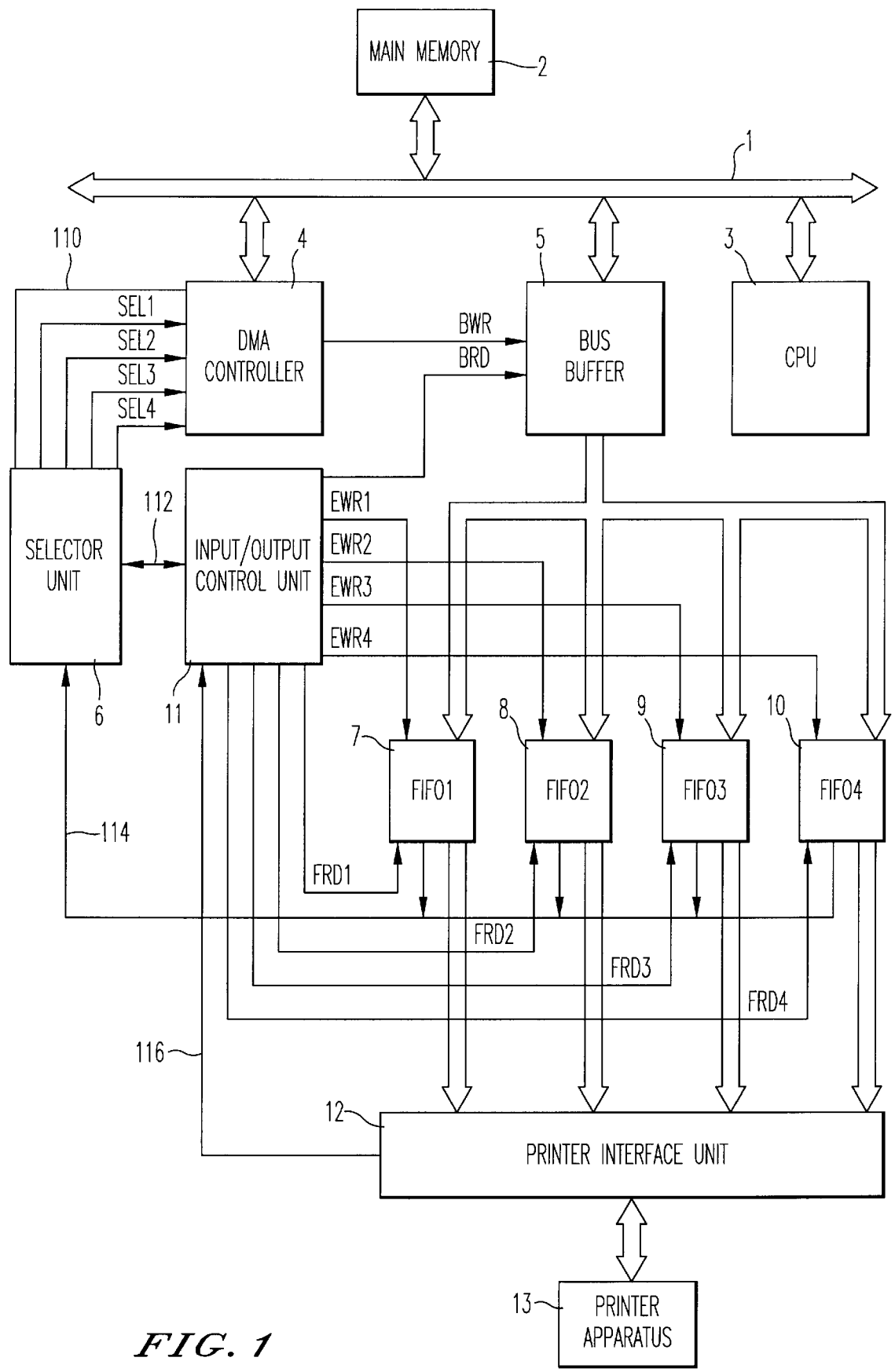
FIG. 1 is a block diagram illustrating a configuration of an embodiment of an image information processing apparatus including a DMA mechanism according to the present invention.

Referring now to the drawings, wherein like reference numerals designate identical or corresponding parts throughout the several views, and more particularly to FIG. 1 thereof, an embodiment of the present invention is disclosed.

FIG. 1 is a block diagram illustrating a configuration of an embodiment of an image information processing apparatus including a DMA transfer apparatus according to the present invention.

Referring specifically to FIG. 1, reference numeral 1 designates a system bus to which a main memory 2, a CPU 3, a DMA controller 4 and a bus buffer unit 5 are connected. Also, the bus buffer 5 is connected to four FIFO memories 7, 8, 9 and 10. A printer apparatus 13 is connected through a printer interface unit 12 to these FIFO memories 7, 8, 9 and 10. In this embodiment, the printer apparatus 13 is a color printer.

In the main memory 2, image data of respective color components C, M, Y and K are stored under the control of the CPU 3 for printing out. Each of the FIFO memories 7, 8, 9 and 10 is assigned to one of the color components C, M, Y and K, respectively.

Figure 2:
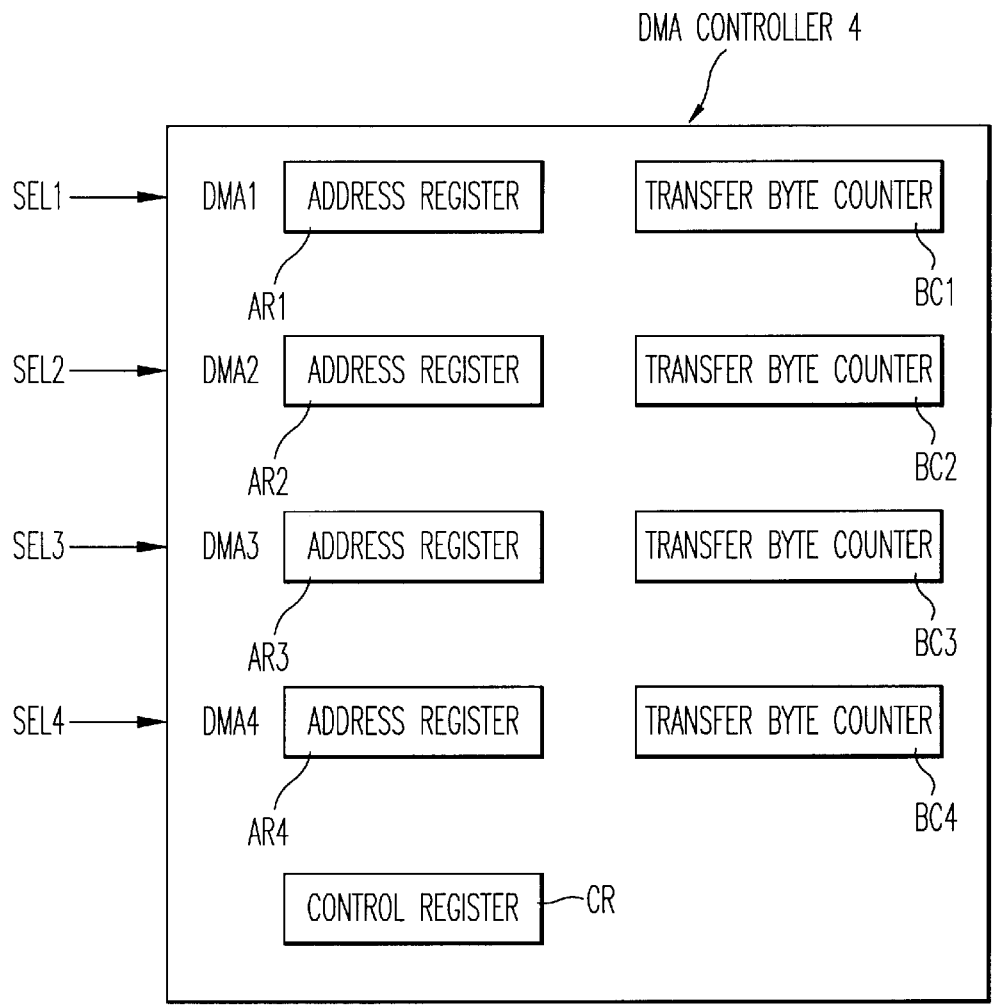
FIG. 2 is a block diagram illustrating in detail the configuration of a DMA controller in FIG. 1.

As shown in FIG. 2, the DMA controller 4 includes four sets of memory address registers AR1–AR4 and transfer byte counters BC1–BC4 for the respective color components C, M, Y and K. The DMA controller 4 further includes a control register CR for storing an input/output operation command of the DMA operation. A selector unit 6, see again FIG. 1, provides the DMA controller 4 with select signals SEL1, SEL2, SEL3 and SEL4 which control the DMA operation. The DMA operation of the present embodiment is started in a predetermined order or in accordance with amounts of data in the respective FIFO memories 7, 8, 9 and 10. An input/output control unit 11 provides for monitoring a printing condition of the printer apparatus 13 through the printer interface unit 12. The input/output control unit 11 sends write signals EWR1 to EWR4 and read signals FRD1 to FRD4 to the FIFO memories 7, 8, 9 and 10, respectively, so as to control writing and reading of image data of the respective color components.

The operation of the embodiment of the present invention will be described in the following steps with reference again to FIG. 1.

STEP 1: When a color image is printed by the printer apparatus 13, the CPU 3 prepares image data of the respective color components in the main memory 2. The CPU 3 issues the input/output operation command to the DMA controller 4.

STEP 2: When the DMA controller 4 receives the input/output operation command, that is, a print request, the DMA controller 4 then stores four sets of DMA memory addresses and numbers of bytes to be transferred in the memory address registers AR1–AR4 and the transfer byte counters BC1–BC4, with respect to each of the color components. Thereafter, the DMA controller 4 issues the print request to the selector unit 6 through a signal line 110.

STEP 3: The selector unit 6, which has received the print request, selects a color component on which the DMA operation can be started. The selector unit 6 instructs the DMA controller 4 to perform the DMA operation for the selected color component, to be designated through the select signals SEL1 to SEL4. Simultaneously, the selector unit 6 notifies the input/output control unit 11 of information indicating the selected color component through a signal line 112. The selector unit 6 is provided for a selection method which is described later in detail with reference to FIGS. 3, 4 and 5.

STEP 4: The DMA controller 4, which has received the select signals SEL1 to SEL4, acquires a bus use right for the system bus 1. Then, the DMA controller 4 executes DMA operation for image data in the main memory 2 using the DMA memory address registers AR1–AR4 associated with the selected color component. The read image data is then transferred to the bus buffer 5. The bus buffer 5 receives a write signal BWR generated from the DMA controller 4, and once holds the DMA-transferred image data therein.

STEP 5: The input/output control unit 11 generates a read signal BRD to the bus buffer 5, and generates write signals EWR1, EWR2, EWR3 or EWR4 to the FIFO memories 7, 8, 9 or 10, respectively. The input/output control unit 11 reads the image data from the bus buffer 5 and transfers the read image data to the FIFO memories 7, 8, 9 or 10, corresponding to the selected color component of the transferred image data.

STEP 6: When a next DMA operation is enabled to start, the selector unit 6 selects a color component for the next DMA operation. Then, the selector unit 6 generates the select signal, SEL1, SEL2, SEL3 or SEL4, which corresponds to the next selected color component, to the DMA controller 4. The DMA controller 4 reads image data of the next selected color component from the main memory 2 and executes a DMA operation of the next read image data to the bus buffer 5.

STEP 7: On the other hand, the input/output control unit 11 has been monitoring a printing condition of the printer apparatus 13 through the printer interface unit 12 and the signal line 116. The input/output control unit 11 sends read signals FRD1, FRD2, FRD3 or FRD4 to the respective FIFO memories 7, 8, 9 or 10 in conformity to printing delays of the respective color components of the printer apparatus 13. The input/output control unit 11 reads out image data from the FIFO memories 7, 8, 9 or 10, and outputs the read image data to the printer apparatus 13 through the printer interface unit 12.

STEP 8: The above-mentioned processings of STEP 6 and STEP 7 are performed in parallel. During the processing of the DMA operations, the DMA controller 4 decrements the value of the transfer byte counter BC1–BC4 associated with the selected color component which has been transferred in each of the DMA processing. In this way, when the values of all the transfer byte counters BC1–BC4 for the respective color components reach zero, the DMA controller 4 terminates the DMA transfer operation.

Figure 3:
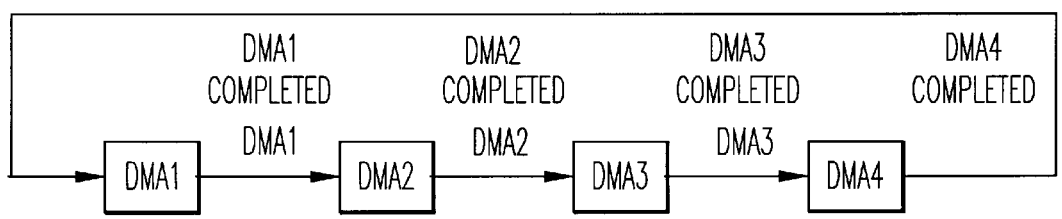
FIG. 3 is a diagram illustrating an example of a DMA selection method in a selector unit in FIG. 1.
Figure 4:
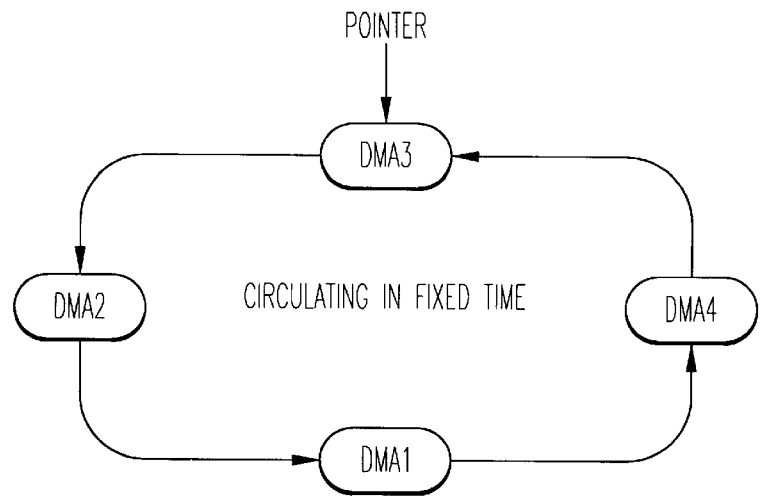
FIG. 4 is a diagram illustrating another example of the DMA selection method in the selector unit in FIG. 1.
Figure 5:
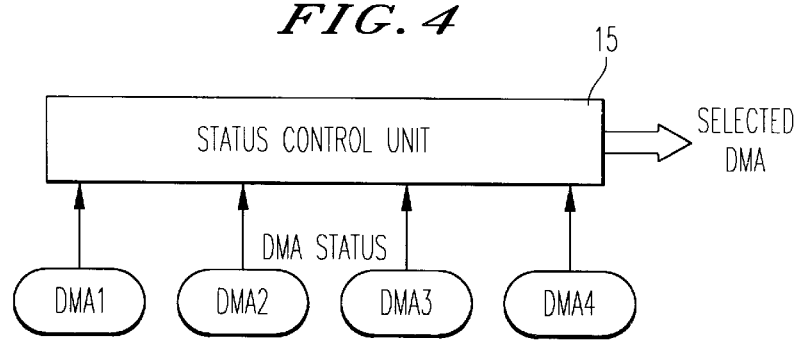
FIG. 5 is a diagram illustrating a further example of the DMA selection method in the selector unit in FIG. 1.
Figure 7:
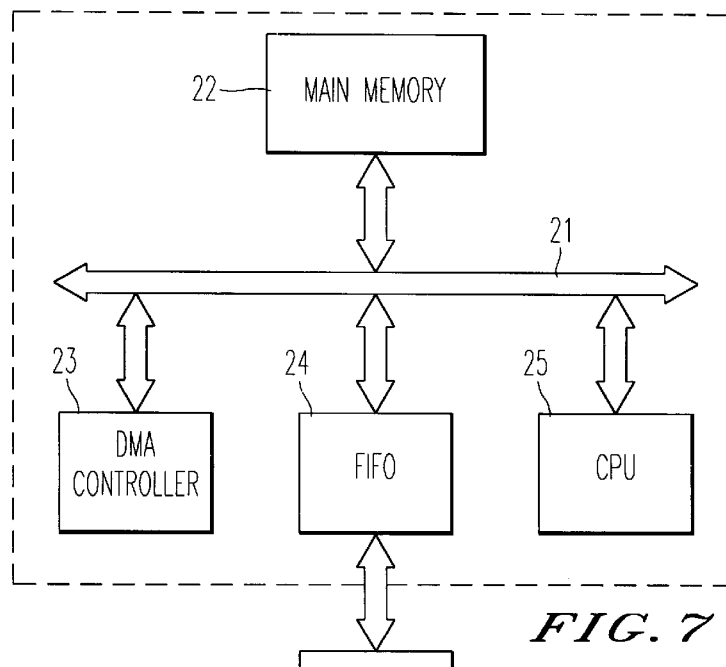
FIG. 7 is a block diagram illustrating a general configuration of an image information processing apparatus including a background DMA mechanism.

FIGS. 3, 4 and 5 are diagrams each explaining a DMA selection method in the selector unit 6. In FIGS. 3, 4 and 5, DMA 1, DMA 2, DMA 3 and DMA 4 correspond to the DMA operations for the respective color components.

In the method illustrated in FIG. 3, the selector unit 6 is provided for fixing an order of selecting the DMA operations for the respective color components. Therefore, when a DMA operation is completed for a color component, a DMA operation for a next color component is selected. The selector unit 6 monitors the amount of transferred data in the respective FIFO memories 7, 8, 9 or 10 through a signal line 114, and continuously performs the DMA operations in turns of the color component. Accordingly, if the FIFO memory corresponding to one color component is filled with transferred data, the selector unit 6 selects a DMA operation for another color component. This sequence is repeated until the DMA operation for the last color component is completed. After the DMA operation for the last color component is completed, the selector unit 6 selects the first color component once again. Then, the selector unit 6 waits for the amount of data in the associated FIFO memory to decrease. Then, the selector unit 6 resumes the selection of the DMA operations.

In the method illustrated in FIG. 4, the selector unit 6 provides for selecting the DMA operations for the respective color components in a loop shape, so that the DMA operations for the respective color components are sequentially selected in a time divisional manner. A pointer is provided for pointing to the DMA operation for the color component to be currently selected. The pointer makes a round of the loop in a fixed time. At the time a print request is generated, the selector unit 6 selects the DMA operation for the color component pointed to by the pointer at that time.

When a DMA operation for a predetermined data size, for example one data block, is completed, the pointer moves to the DMA operation for the next color component which is selected by the selector 6. It should be noted that also in this method, the selector unit 6 skips the pointer to the next color component when the FIFO memories 7, 8, 9 or 10 associated with the preceding color component are filled with the full amount of data.

In the method illustrated in FIG. 5, the selector unit 6 may be provided with a status control unit 15 for managing which of the DMA operations can be performed for each of the color components. The selector unit 6 selects a color component for which of the DMA operation can be performed based on the status control unit 15 and notifies the DMA controller 4 of the selected color component.

Figure 6:
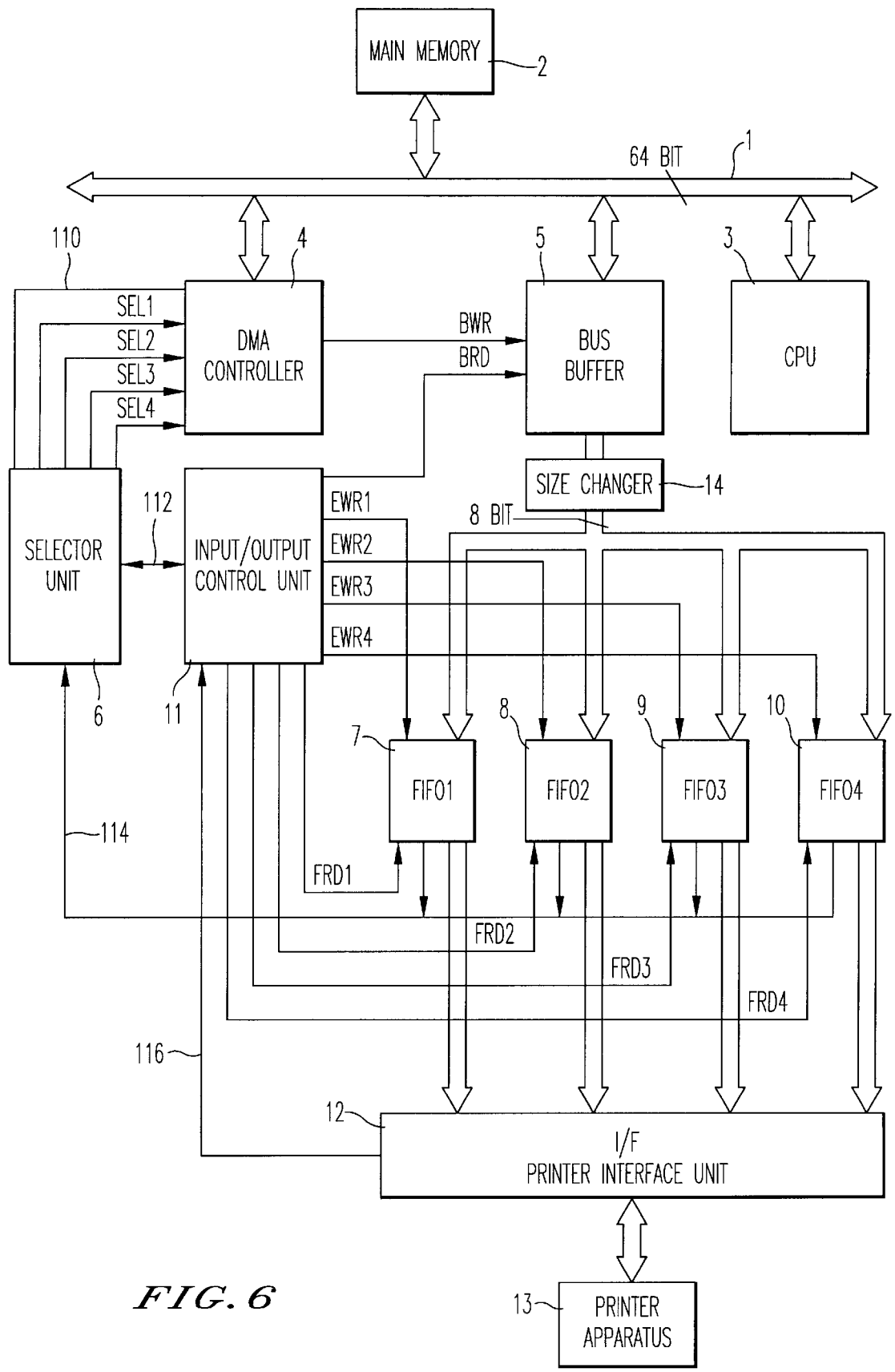
FIG. 6 is a block diagram illustrating the configuration of another embodiment of the image information processing apparatus including a DMA transfer mechanism according to the present invention.

FIG. 6 is a block diagram illustrating a configuration of another embodiment of an image information processing apparatus including a DMA transfer mechanism according to the present invention. In this embodiment, a size changer unit 14 is provided between bus buffer 5 and respective FIFO memories 7, 8, 9 and 10. The configuration in FIG. 6 is identical to the configuration in FIG. 1 except that the size changer 14 is added in the embodiment of FIG. 6. In this embodiment, the DMA operation can be performed even when a data size of the system data bus 1 (for example, 64 bits) is different from the data size of a data bus for the printer 13 (for example, 8 bits).

Accordingly, in the present embodiment, a plurality of image data are DMA transferred to a printer 13 for printing images as required, and the image data are once buffered in FIFO memories 7, 8, 9 and 10 associated with respective color components or respective images before they are output to the printer, so that it is possible to perform a data transfer to an I/O device while reducing the amount of used memories providing efficient bus transactions, and preventing a degraded performance of the whole system.

The above described embodiment is arranged for a color image processing apparatus using respective color components C, M, Y and K. However, if the printer apparatus 13 is a monochrome printer in the embodiment as shown in FIG. 1 or FIG. 6, the color component selector 6 may be used as an image selector to sequentially select a plurality of images for continuously printing out the plurality of images.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A DMA transfer apparatus for performing DMA operations, included in an image information processing apparatus in which a CPU, a main memory, and a color image forming device are connected, said DMA transfer apparatus comprising:
   a DMA controller including a plurality of DMA address registers and transfer count registers corresponding to color components of the color image forming device for executing a plurality of DMA operations for the color components;
   a selector unit for instructing said DMA controller to select one of the color components for a DMA operation;
   a plurality of FIFO memories corresponding to the color components for holding data read from said main memory by said DMA operation executed by said DMA controller; and
   an input/output control unit for controlling outputting of data from said plurality of FIFO memories to said printer in conformity to printing of said printer and based on a signal of the selected color component from the selector unit.

2. A DMA transfer apparatus according to claim 1, wherein said selector unit connects a plurality of DMA operation units in a loop shape, and moves a pointer to an address to which data can be transferred in a time division multiplex manner.

3. A DMA transfer apparatus according to claim 1, wherein said selector unit matches each of a plurality of DMA addresses with a timing at which data is output to the printer, manages a status indicating whether or not a data transfer is possible, and selects a DMA address indicated by said status that a data transfer is possible at a time a transfer is requested, so that said DMA controller transfers data at the selected DMA address at the time the transfer is requested.

4. A DMA transfer apparatus according to claim 1, wherein said data output from said plurality of FIFO memories to said color image forming device is color data of a predetermined number of color components.

5. A DMA transfer apparatus according to claim 2, wherein said selector unit selects a DMA operation pointed to by the pointer at a time a transfer request is generated, and notifies said DMA controller of the selected DMA operation.

6. A DMA transfer apparatus according to claim 4, wherein a number of said plurality of FIFO memories corresponds to the predetermined number of color components.

7. A DMA transfer apparatus according to claim 6, wherein said predetermined number of color components are color components of black, yellow, cyan and magenta.

8. A DMA transfer apparatus for performing DMA operations, included in an image information processing apparatus in which a CPU, a main memory, and color image forming device are connected, said DMA transfer apparatus comprising:
   a DMA control means including a plurality of DMA address registers and transfer count registers corresponding to color components of the color image forming device for executing a plurality of DMA operations for the color components;

a selector means for instructing said DMA control means to select one of the color components for a DMA operation;

a plurality of memory means corresponding to the color components for holding data read from said main memory by said DMA operation executed by said DMA control means; and an input/output control means for controlling outputting of data from said plurality of memory means to said printer in conformity to printing of said printer and based on a signal of the selected color component from the selector means.

9. A DMA transfer apparatus according to claim 8, wherein said selector means connects a plurality of DMA operation means in a loop shape, and moves a pointer means to an address to which data can be transferred in a time division multiplex manner.

10. A DMA transfer apparatus according to claim 8, wherein said selector means matches each of a plurality of DMA addresses with a timing at which data is output to the printer, manages a status indicating whether or not a data transfer is possible, and selects a DMA address indicated by said status that a data transfer is possible at a time a transfer is requested, to that said DMA control means transfers data at the selected DMA address at the time the transfer is requested.

11. A DMA transfer apparatus according to claim 8, wherein said data output from said plurality of memory means to said color image forming apparatus is color data of a predetermined number of color components.

12. A DMA transfer apparatus according to claim 9, wherein said selector means selects a DMA operation means pointed to by the pointer means at a time a transfer request is generated, and notifies said DMA control means of the selected DMA.

13. A DMA transfer apparatus according to claim 11, wherein a number of said plurality of memory means corresponds to the predetermined number of color components.

14. A DMA transfer apparatus according to claim 13, wherein said predetermined number of color components are color components of black, yellow, cyan and magenta.

* * * * *